(12) United States Patent
Borghi

(10) Patent No.: US 9,167,739 B2
(45) Date of Patent: Oct. 27, 2015

(54) QUICK SAFETY CONNECTION FOR COUPLING A TOOL TO AN OPERATING MACHINE

(75) Inventor: Giovanni Borghi, Modena (IT)

(73) Assignee: C.M.C. S.R.L.-SOCIETA UNIPERSONALE, Castelfranco Emilia (IT)

( * ) Notice: Subject to any disclaimer, the term of this patent is extended or adjusted under 35 U.S.C. 154(b) by 263 days.

(21) Appl. No.: 13/576,295

(22) PCT Filed: Feb. 11, 2011

(86) PCT No.: PCT/IB2011/000258
§ 371 (c)(1),
(2), (4) Date: Jul. 31, 2012

(87) PCT Pub. No.: WO2011/121400
PCT Pub. Date: Oct. 6, 2011

(65) Prior Publication Data
US 2013/0011180 A1    Jan. 10, 2013

(30) Foreign Application Priority Data

Mar. 30, 2010   (IT) .............................. MO2010A0090

(51) Int. Cl.
*B25G 3/00*   (2006.01)
*A01B 59/06*  (2006.01)
(Continued)

(52) U.S. Cl.
CPC ................ *A01B 59/06* (2013.01); *B66F 9/065* (2013.01); *E02F 3/283* (2013.01); *E02F 3/3631* (2013.01); *E02F 3/3663* (2013.01); *Y10T 403/32213* (2015.01); *Y10T 403/593* (2015.01); *Y10T 403/598* (2015.01)

(58) Field of Classification Search
CPC ............. Y10T 403/32213; E02F 3/283; E02F 3/3631; A01B 59/06
USPC .......... 403/322.3, 323, 324; 414/723; 37/405, 37/468, 903; 172/272, 273, 439
See application file for complete search history.

(56) References Cited

U.S. PATENT DOCUMENTS 3,556,323 A  *  1/1971  Heimmermann et al. ..... 414/723
3,760,883 A  *  9/1973  Birk .............................. 172/273
(Continued)

FOREIGN PATENT DOCUMENTS

CA         970559       7/1975
EP       1 577 256 A1   9/2005
(Continued)

*Primary Examiner* — Daniel P Stodola
*Assistant Examiner* — Matthew R McMahon
(74) *Attorney, Agent, or Firm* — Arent Fox LLP

(57) ABSTRACT

A quick connection that allows fastening a tool to the lifter arm of an operating machine and includes first and second joining devices associated respectively to the lifter arm and the tool aimed at being reciprocally engaged. The first joining device includes a swivel head that swivels between a raised position and a lowered one and a first gudgeon; the second joining device includes a shaped body that defines a calibrated inlet opening and support structure. The swivel head, in raised position, enters the shaped body through the opening, then it rotates to its lowered position, thus bringing the first gudgeon in engagement with the support structure. The shaped body includes a stop aimed at striking a winglet of the swivel head and at preventing the swivel head from going out in any succession of movements which are not inversely equal to those carried out for the introduction.

18 Claims, 7 Drawing Sheets

(51) Int. Cl.
*B66F 9/065* (2006.01)
*E02F 3/28* (2006.01)
*E02F 3/36* (2006.01)

(56) References Cited

U.S. PATENT DOCUMENTS

| | | | | |
|---|---|---|---|---|
| 3,874,533 | A * | 4/1975 | Montgomery et al. | 414/723 |
| 3,876,091 | A * | 4/1975 | MacDonald | 414/723 |
| 3,887,096 | A * | 6/1975 | Wieland | 414/723 |
| 3,985,249 | A * | 10/1976 | Aker et al. | 414/723 |
| 4,452,560 | A * | 6/1984 | Coyle et al. | 414/723 |
| 5,098,252 | A * | 3/1992 | Sheesley et al. | 414/723 |
| 5,431,528 | A * | 7/1995 | Jenkins et al. | 414/723 |
| 5,597,283 | A * | 1/1997 | Jones | 414/723 |
| 5,732,488 | A * | 3/1998 | Smith | 37/468 |
| 6,108,951 | A * | 8/2000 | Renfrow et al. | 37/468 |
| 6,231,296 | B1 * | 5/2001 | Blomgren | 414/723 |
| 6,709,224 | B2 * | 3/2004 | Heiple | 414/723 |
| 7,014,385 | B2 * | 3/2006 | Lim et al. | 403/322.4 |
| 7,509,758 | B2 * | 3/2009 | Nesseth | 37/231 |
| 7,752,781 | B2 * | 7/2010 | Riedlberger et al. | 37/468 |
| 8,469,623 | B2 * | 6/2013 | Luyendijk et al. | 403/322.1 |
| 8,887,416 | B2 * | 11/2014 | Ostermeyer | 37/406 |
| 2005/0207836 | A1 * | 9/2005 | Melander | 403/324 |
| 2006/0242865 | A1 * | 11/2006 | Herguido Fo | 37/468 |
| 2007/0201973 | A1 * | 8/2007 | McDermott et al. | 414/723 |

FOREIGN PATENT DOCUMENTS

| | | |
|---|---|---|
| GB | 2 310 472 A | 8/1997 |
| WO | WO 00/75437 | 12/2000 |

* cited by examiner

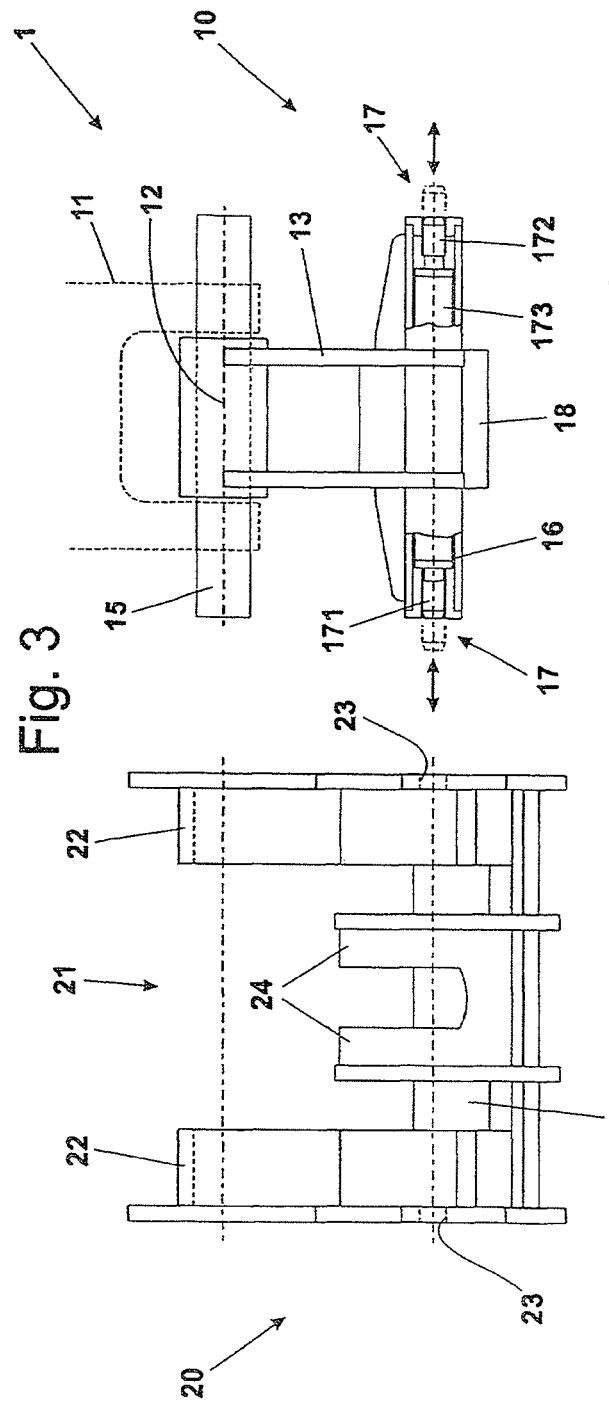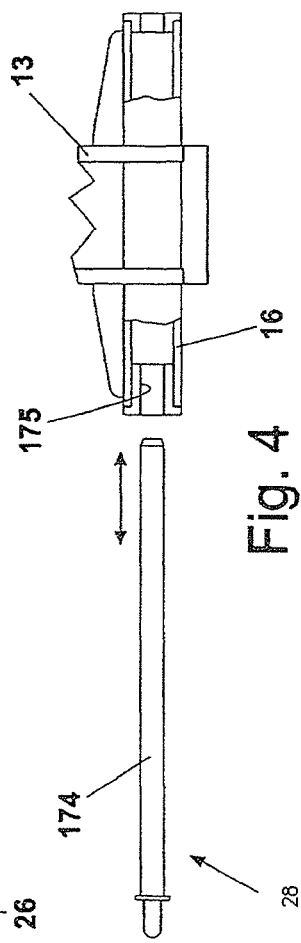

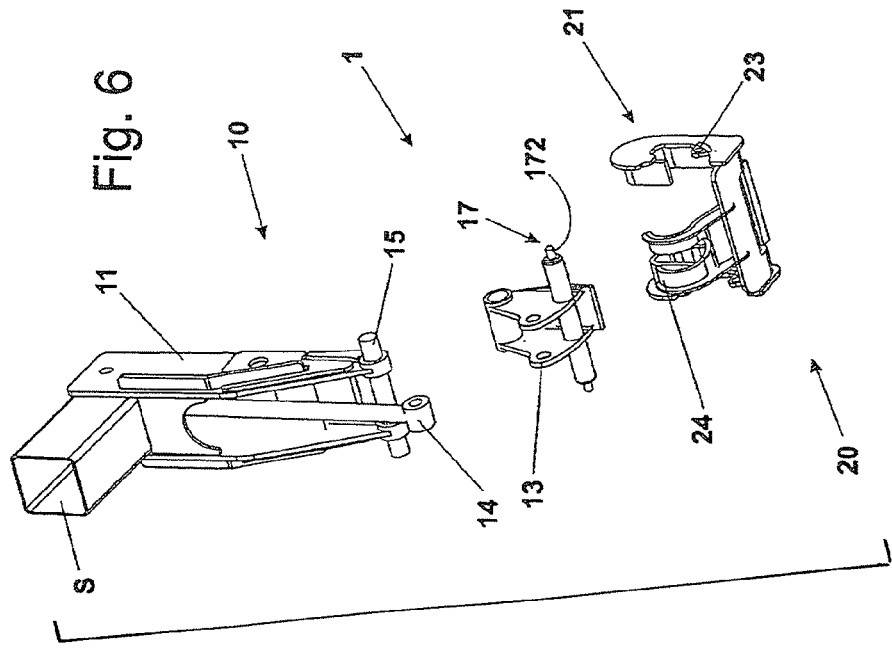
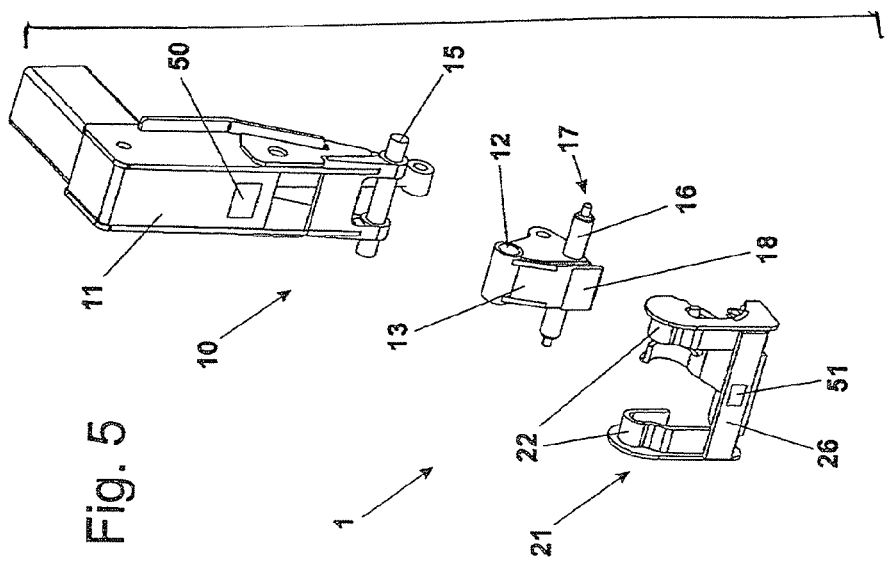

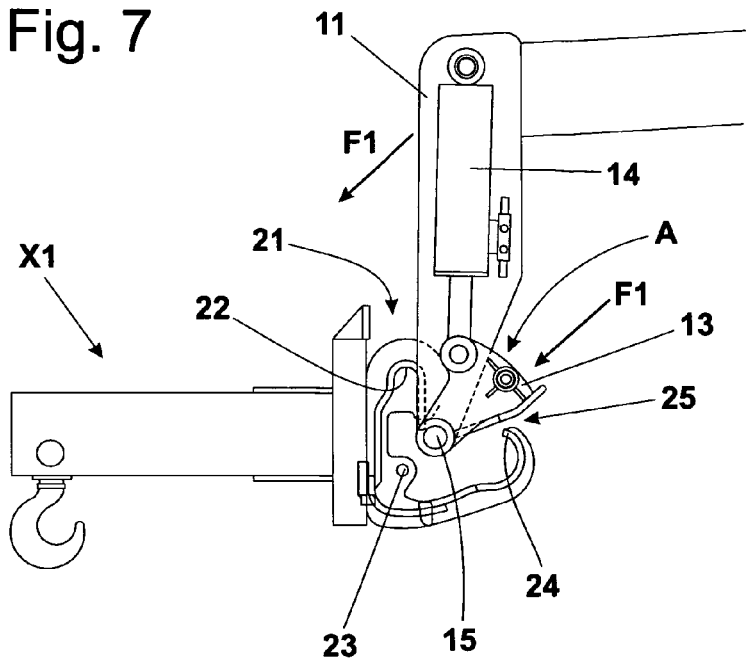
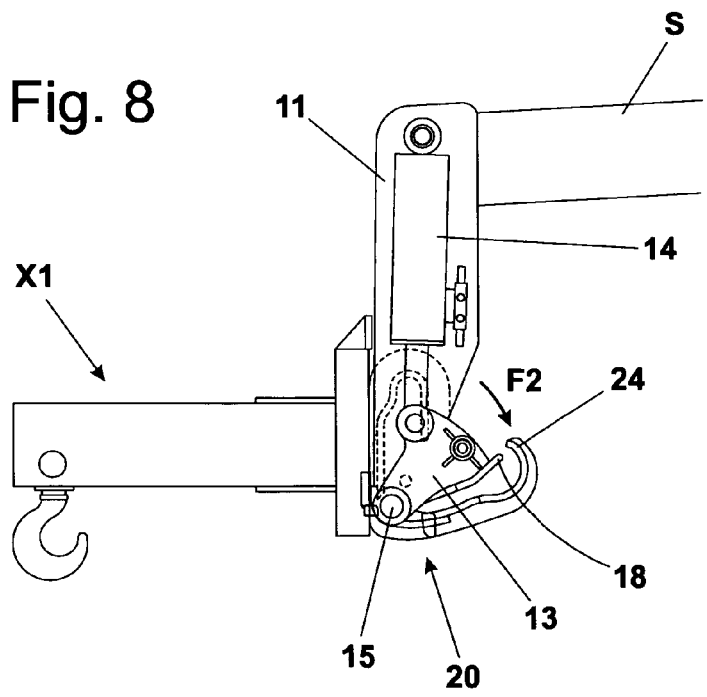

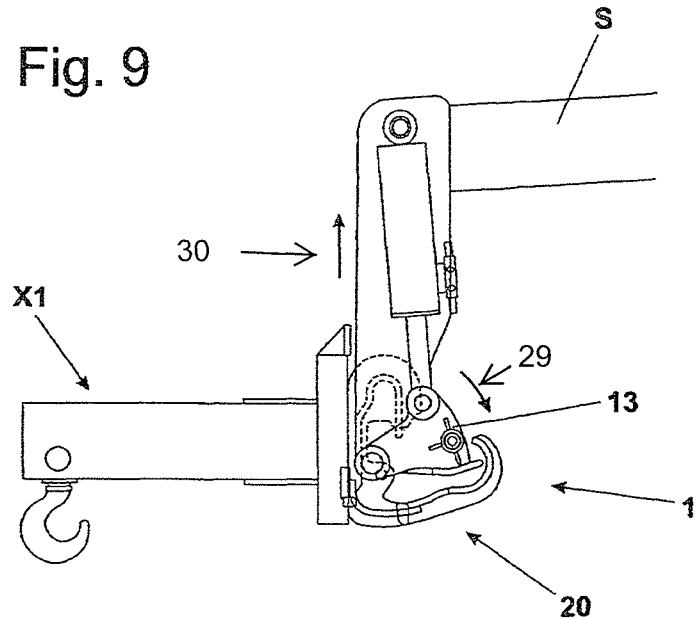
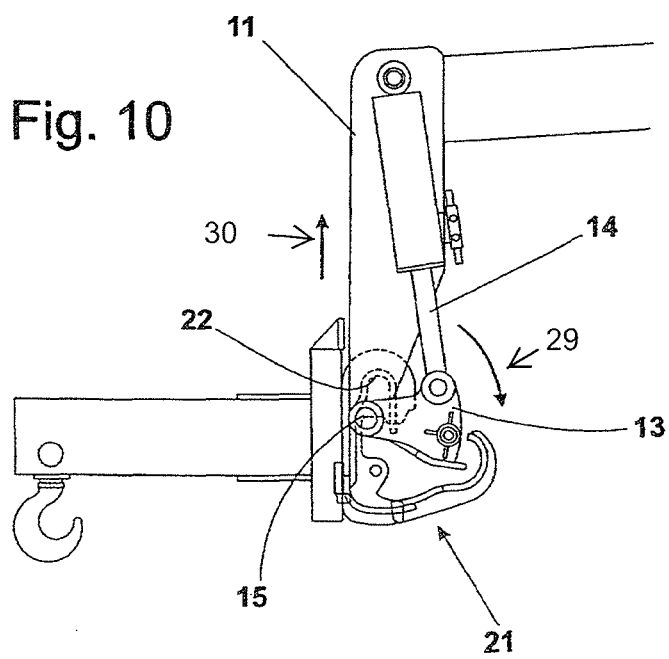

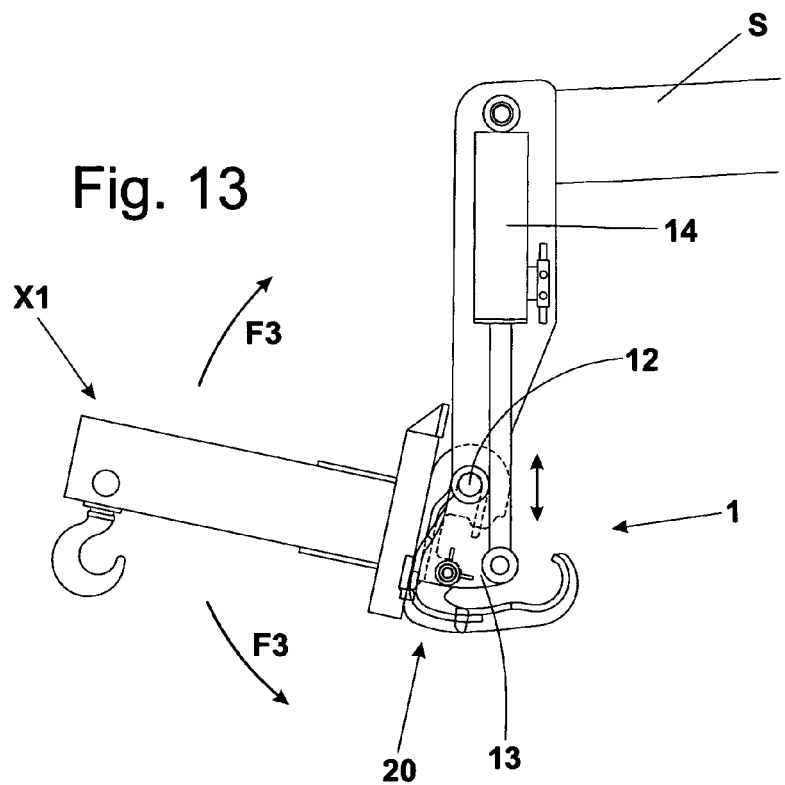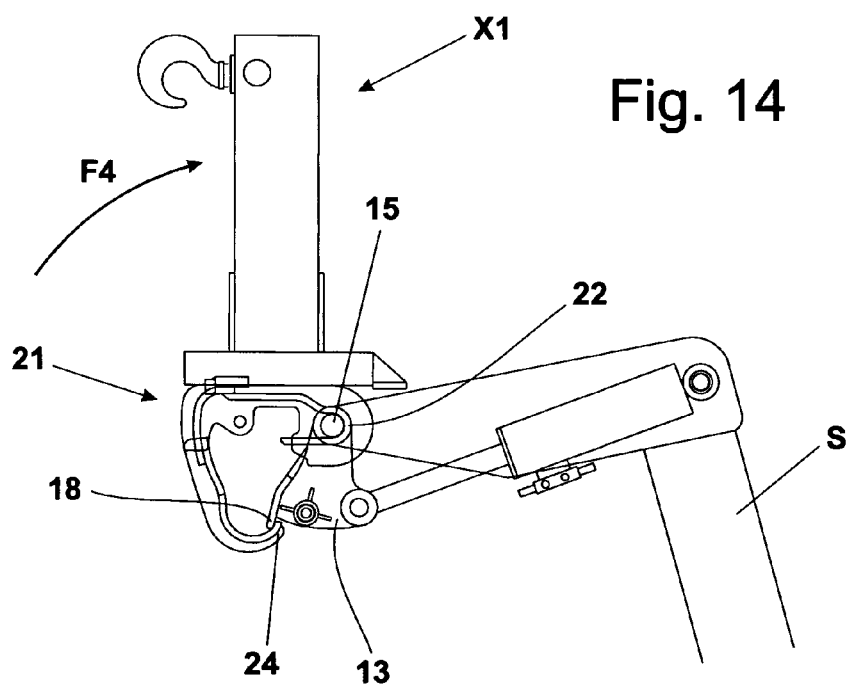

QUICK SAFETY CONNECTION FOR COUPLING A TOOL TO AN OPERATING MACHINE

DESCRIPTION OF THE INVENTION

This application is a National Stage entry of International Application PCT/IB2011/000258, filed Feb. 11, 2011, which claims priority to Italian Patent Application No. MO2010A000090, filed Mar. 30, 2010, the disclosure of the prior applications are hereby incorporated in their entirety by reference.

The invention relates to the technical field concerning self-moving operating machines, for example of the type used in building industry, agriculture or the like. Among said machines, those equipped with a lifting mechanism are considered, which have a tilt telescopic arm featuring, fastened to a free end, a tool or device suitable for the operation to be carried out.

Obviously, when required, it is necessary to substitute the tool with another one in a reasonably short time.

Consequently, the conventional systems with bolts and the like are not very suitable for said fastening, since they require a lot of time and sometimes, the use of further devices for moving the tools because of their considerable weight.

Therefore, the so-called quick connection systems are widespread, shaped so as to allow a rapid coupling of the tool to the lifting mechanism and as quick uncoupling therefrom, when the work is over.

Said quick connection systems are substantially formed of two parts, one of which is integral with the lifter arm and the other with each tool.

With the tool on the ground, the lifter arm is suitably operated to engage the two parts one with the other.

Normally, when said operation is finished, a constraining element, which is introduced manually, stabilizes the coupling between the two parts and makes them integral, so that the tool not only can be raised and lowered, but it can also be swiveled by the actuators connected to the lifter arm.

The said constraining element is introduced also for obvious safety reasons, to prevent the tool, when it has reached some determined positions, even from casual uncoupling, which could result in serious consequences.

Unfortunately, possible errors or negligence can lead to the use of the tool without having set said constraining element to work, with all the risks of the case.

Therefore, it is an object of the present invention to propose a quick safety connection for joining a tool to an operating machine, shaped so as to prevent, once the coupling has been obtained, the possibility of casual uncoupling. Another object of the invention is to obtain a connection that allows easy tool engaging and disengaging operations, without the need of direct manual actions in the coupling area during the operations.

A further object of the invention relates to the will to propose a connection that ensures its functionality even in difficult climate conditions and/or in presence of dirt, mud or other.

A still further object of the invention is to obtain a connection, in which the part integral with the tool can remain outdoors even for long periods of time, without jeopardizing its subsequent re-use.

The characteristic features of the invention will become clear from the following description of a preferred embodiment of the connection under discussion, in accordance with the contents of the claims and with the help of the enclosed drawings, in which:

FIG. 3 is a front view of joining means of the tool and lifter arm, put side by side, that form the connection under discussion;

FIG. 4 shows a portion of the joining means of the lifter arm in a variant embodiment;

FIGS. 5, 6 are axonometric exploded views of the quick connection under different angles;

FIGS. 7 through 11 are lateral views of various steps, during which the joining means of the arm engages with the joining means of the tool;

FIG. 13 is a lateral view of the connection in normal working condition;

FIG. 14 is again a lateral view of the connection in abnormal working condition.

Figure 1:
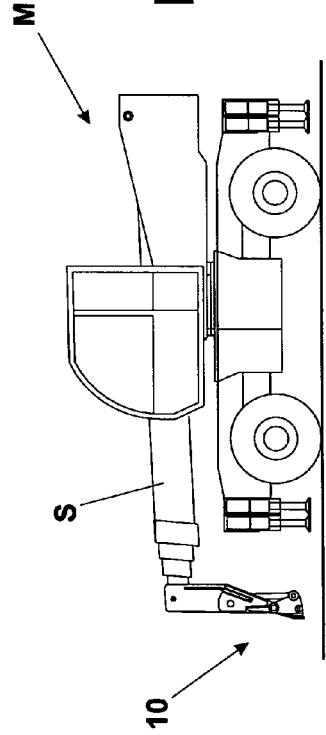
FIG. 1 is a schematic lateral view of an operating machine.

With, reference to the above mentioned figures, an operating machine, as a whole, has been indicated with M.

The operating machine M, of substantially known type, is provided with a telescopic lifter arm S, hinge articulated to the rear part of the machine M, moveable along a vertical plane, and having, fastened to a free end, a tool or device suitable for the operation to be carried out.

Said tool, in a first example indicated with reference X1, consists of a frame that carries in its lower part a lifting hook (FIGS. 2A, 7, 8 9, 10, 11, 13, 14).

In a second example, said tool, indicated with the reference X2, consists of a fork support element.

The quick safety connection 1 proposed by the invention, that allows joining the tool X1, or the tool X2 or other, not shown tools, to the lifter arm S, comprises first and second joining means 10, 20, associated respectively to said lifter arm S and to each of said tools X1, X2.

The above mentioned first joining means 10 comprises a supporting structure 11, extending downwards in a substantially vertical direction, fastened to the free end of the lifter arm S.

A swivel head 13 is articulated to the lower end of said support frame 11, at a pivot 12 with horizontal axis, and moved by an actuator 14, for example hydraulic, to swivel in a vertical plane between a raised position A and a lowered one B.

At least one main support element 15 is also fastened to the lower end of said support frame 11 and consists, for example, of a first gudgeon with horizontal axis, that protrudes from both sides of the frame 11 and is coaxial with the articulation pivot 12 of said swivel head 13.

At least one auxiliary constraining element 16, associated to the swivel head, consists, for example, of a second gudgeon with horizontal axis parallel to that of said first gudgeon 15.

At least one movable element, whose functions will be explained later, is associated to said second gudgeon 16.

Figure 12:
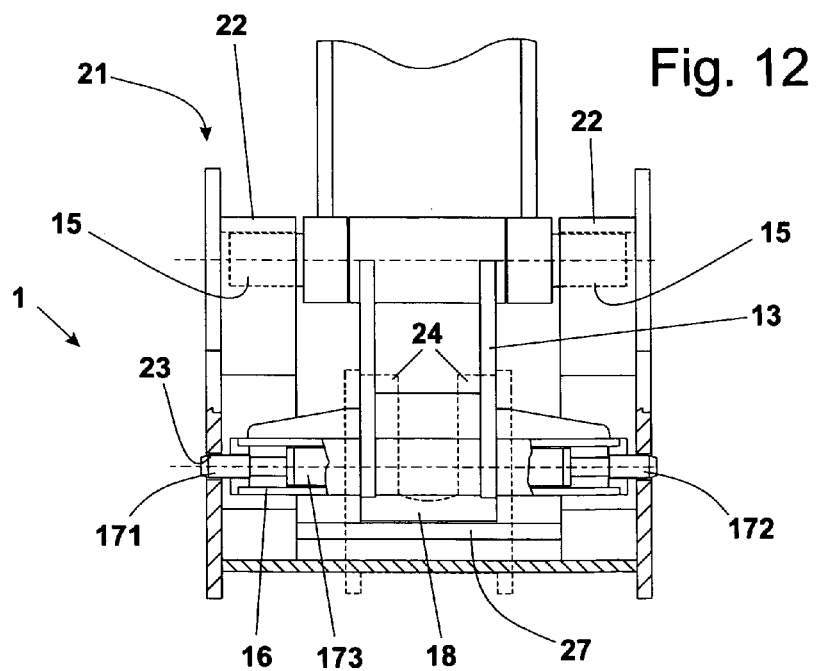
FIG. 12 is a view similar to that of FIG. 3 of the joining means of the arm and tool, mutually engaged, with parts in cross-section.

In a preferred constructive solution (FIGS. 3, 12), said movable element 17 consists of a pair of opposed pins 171, 172, housed at the ends of the above mentioned second gudgeon 16 and operated so as to come out axially from this latter, by an actuator 173, for example hydraulic, contained inside the second gudgeon 16.

In a variant embodiment (FIG. 4), said movable element 28 consists of a rod 174, aimed at being partially introduced into an axial seat 175, made in said second gudgeon 16, so as to come out from both heads of the latter.

The support frame 11 is made translate from the bottom upwards 30, in step relation with further downward oscillation 29 of the swivel head 13, which determines the progressive lifting of the first gudgeon 15 toward the support means 22 (FIGS. 9, 10).

Finally, the above mentioned first joining means 10 includes at least one winglet 18, made integral with said swivel head 13 and extending from the lower part of this latter.

The above mentioned second joining means 20 includes a shaped body 21, which is made integral with the rear part of the tool X1, X2 and which defines:
  support means 22, having the form of an overturned "U", aimed at being engaged by the protruding portions of said first gudgeon 15;
  at least one fastening eyelet 23, aimed at being engaged by said movable element associated to said second gudgeon 16;
  at least a stop 24, aimed at intercepting the above mentioned winglet 18 of the swivel head 13 and at preventing the latter from going out casually;
  a calibrated inlet opening 25, delimited from the top by said support means 22 and from the bottom by said stop 24, aimed at allowing the introduction of the swivel head 13 and of the first gudgeon 15 into the shaped body 21 in a way described below;
  a vertical edge 26, aimed at contacting frontally said swivel head 13, when it is inside said shaped body 21.

Figure 2B:
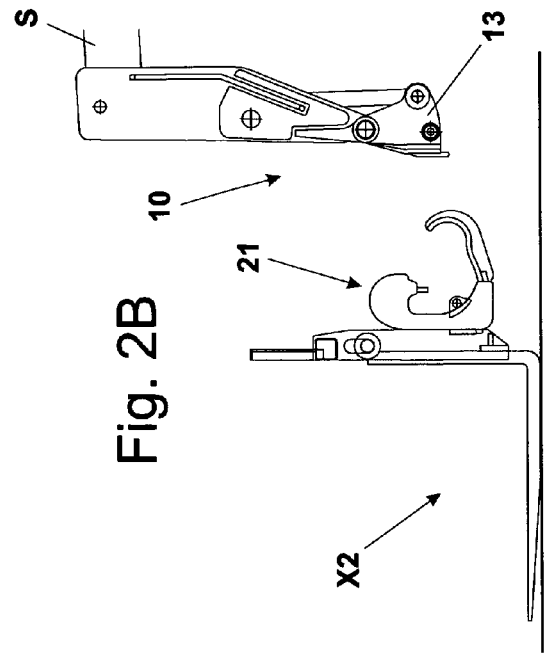
FIG. 2B is a similar view of that of FIG. 2A, of a second tool to be joined.
Figure 2A:
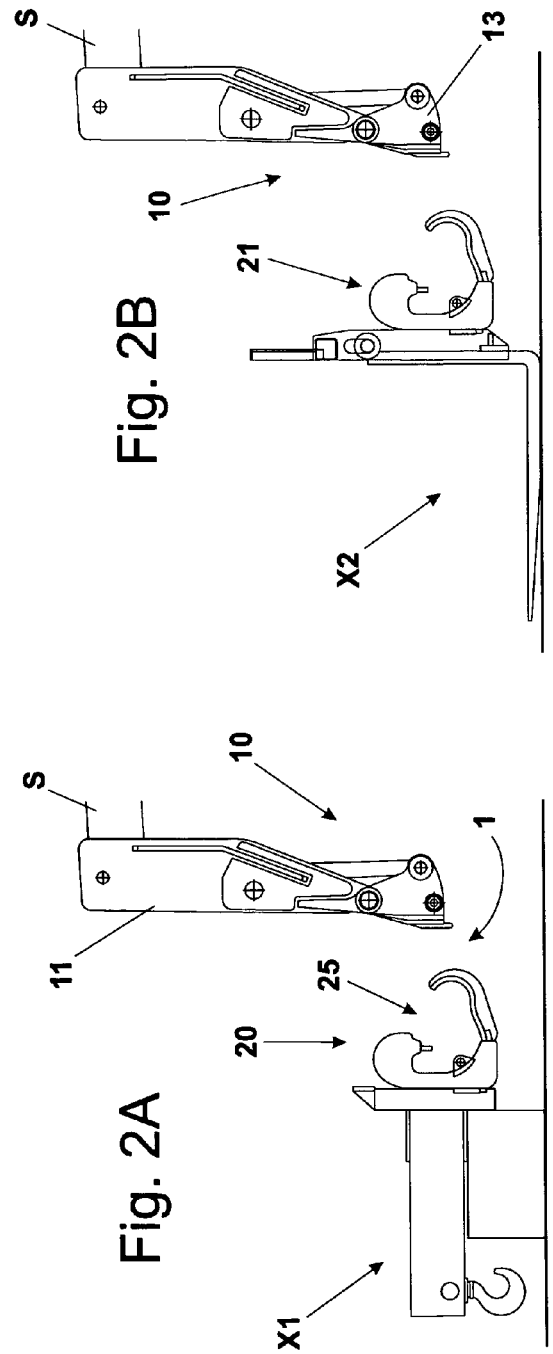
FIG. 2A is an enlarged view of the end of the lifter arm of the machine of FIG. 1, in proximity of a first tool to be joined.

The steps necessary to join a tool X1, X2, placed on the ground or resting on a suitable base, in horizontal arrangement, will be described now (FIGS. 2A, 2B). The first step includes maneuvering the machine M and the lifter arm S so that the swivel head 13 becomes arranged behind the shaped body 21 and centered transversally with respect thereto (see again FIGS. 2A, 2B).

The swivel head 13 is made to rotate, by means of the actuator 14, so as to move it to its raised position A, and the support frame 11 is made translate downwards in an inclined direction (arrows F1 in FIG. 7), by suitable operation of the lifter arm S, which allows the swivel head 13 and the first gudgeon 15 to pass in the calibrated inlet opening 25 so as to fit in the shaped body 21 (FIG. 7).

When the first gudgeon 15 strikes the bottom of said shaped body 21, the swivel head 13 begins to oscillate downwards (arrow F2 in FIG. 8), due to the actuator 14 action; the start of this operation is allowed by the fact that the winglet 18 is inside the stop 24 and does not interfere with it (FIG. 8).

The support frame 11 is made to translate from the bottom upwards, in step relation with further downward oscillation of the swivel head 13, which determines the progressive lifting of the first gudgeon 15 toward the support means 22 (FIGS. 9, 10).

When the swivel head 13 reaches its lowered position B, its front side is struck by the edge 26, while the protruding portions of said first gudgeon 15 go in abutment against the lower part of the support means 22 (FIG. 11); in this condition, the lifter arm S is already capable of lifting the tool X1.

Figure 11:
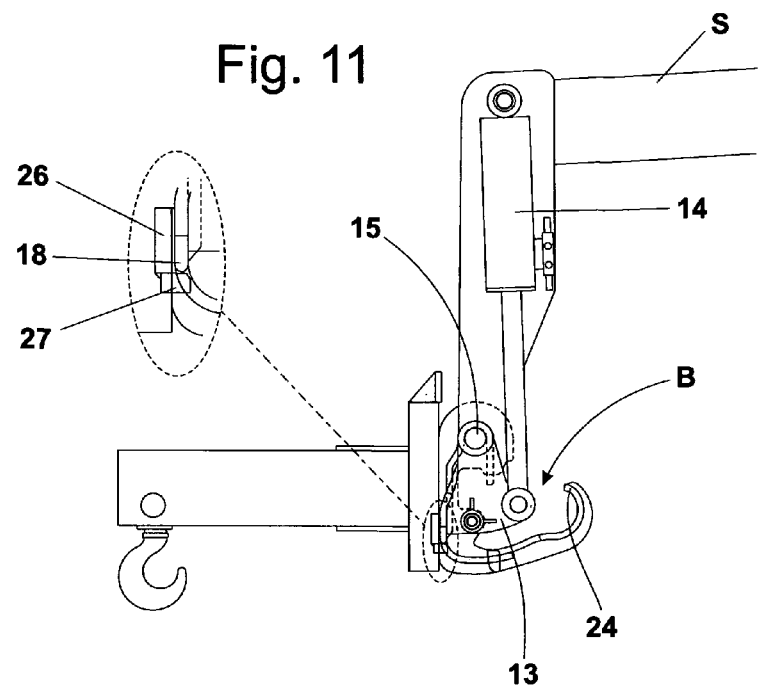

In the enclosed figures, the shaped body 21 advantageously includes a step 27, aimed at going in abutment against the lower part of the winglet 18, when the swivel head 13 is in the just described position (see the enlarged detail of FIG. 11);

The joining procedure is completed by engaging the movable element of the second gudgeon 16 with the fastening eyelets 23, which are coaxial.

With the constructive solution that includes the opposed pins 171, 172, the engagement is obtained by operating suitably the actuator 173 (FIG. 12); while the introduction of the rod 174, as it has already been said, is performed manually.

At this point, said second joining means 20 is integral with the swivel head 13, therefore the tool X1 can oscillate on a vertical plane (arrows F3 in FIG. 13) with respect to the same articulation pivot 12 of the latter, due to the action of said actuator 14 (FIG. 13).

The oscillation of the tool X1 is obviously controlled according to the working requirements and the inclination of the lifter arm S.

In case, in which the joining procedure is not completed with the engagement of the movable element with the fastening eyelets 23, the cantilevered weight of the tool X1 (and of the possible load fastened thereto) keeps the edge 26 in abutment against the swivel head 13, thus, in absence of external factors, the swiveling of the tool X1, by means of the actuator 14, is possible all the same.

The quick connection 1 described hereto does not risk to uncouple casually even if, without the movable element being introduced, anomalous external stresses act on the tool, for example for the impact against an obstacle; in the most disadvantageous situation, illustrated in FIG. 14, the lifter arm S is close to the vertical, while the tool X1 is stressed by a tilting torque (arrow F4) that results in a relative rotation between the shaped body 21 and the swivel head that tends to go out from the latter; such an event is prevented by the interception of the stop 24 by means of the winglet 18 (see again FIG. 14).

In practice, the going out of the swivel head 13 is prevented in any succession of movements which are not inversely equal to those carried out for said introduction.

The quick safety connection 1 can advantageously include a device aimed at automatically identifying the kind of tool that is joined to the machine M, for example to adjust, again in automatic way, the operating parameters of the latter.

Said identifying device, for example, can be of the type consisting of a detection module 50, associated to the support frame 11, aimed at RF interacting with an identifying module 51 associated to the shaped body 21 (FIG. 5).

The identifying module 51 is preferably a so-called passive transponder that does not contain a power source and is activated by the electromagnetic field emitted by the antenna of the detection module 50, when the distance between the two is sufficiently short.

The above description make appear clearly the positive characteristics of the quick connection under discussion that fully obtains all the indicated objects, in particular offering, in any situation, the maximum safety against casual uncoupling.

The tool engaging and disengaging operations are simple and rapid, and the operator, who controls them, does not have to intervene manually during the introduction or removal of the swivel head into or from the shaped body, reducing to a minimum any accident risk.

The conformation of the joining means, either those associated to the tool or those associated to the arm, ensures a safe functionality in difficult climate conditions and/or in presence of dirt, mud or other.

The second joining means associated to the tool does not have any moveable part and consequently, it is suitable for resting outdoors even for long periods of time, without jeopardizing its subsequent re-use.

It is understood that what above has only illustrative and not limiting value, therefore all possible detail modifications applied to the first and/or second joining means for technical and/or functional reasons, are considered since now within the protective scope defined by the claims reported below.

The invention claimed is:

1. A quick safety connection for joining a tool to an operating machine, the operating machine being equipped with a hinge articulated hoisting arm movable in a vertical plane, the quick safety connection comprising:
   a) a first joining means, associated with a free end of said hoisting arm, including:
      a substantially vertical downwardly extending support frame;
      a swivel head, articulated to the lower end of said support frame, at a pivot with a horizontal axis, and moved by an actuator to swivel in a vertical plane between a raised position and a lowered one;
      at least one main support element, fastened to the lower end of said support frame;
      at least one auxiliary constraining element, associated with the swivel head;
      at least one movable member associated with said auxiliary constraining element; and
      at least a winglet plate, made integral with said swivel head and extending from the bottom of the swivel head, and
   b) a second joining means, made integral with said tool, including:
      a shaped body, which defines a calibrated inlet opening, designed to allow introduction of said main support element and the swivel head, the swivel head being arranged in said raised position, as a consequence of a downward movement imparted to said support frame in a predetermined direction;
      support means, formed by said shaped body, designed to be engaged by said main support element as a consequence of a combined movement formed by an upward movement of the support frame and a swivel motion of said swivel head from the raised position to the lowered position;
      at least one fastening eyelet, attached to said shaped body, designed to be engaged by said at least one movable member associated with said auxiliary constraining element, at the end of said combined movement, to fasten said second joining means to the swivel head;
      at least a stop, formed by said shaped body designed to intercept the winglet plate of the swivel head and to prevent the swivel head from exiting the calibrated inlet opening in any succession of movements which are not inversely equal with respect to those made during said combined movement;
      wherein the second joining means is configured such that the at least one stop does not interact with the winglet plate during the combined movement.

2. A quick connection according to claim 1, wherein said main support element includes a first gudgeon with a horizontal axis, fastened to the lower end of said support frame so as to protrude from both sides of the support frame and to be coaxial with said pivot of said swivel head.

3. A quick safety connection according to claim 1, wherein said auxiliary constraining element includes a second gudgeon with a horizontal axis parallel to that of said main support element, and wherein said movable member associated with said auxiliary constraining element includes a pair of opposed pins, housed at the ends of the second gudgeon and operated so as to extend from said second gudgeon to engage at least a corresponding one of said at least one fastening eyelet.

4. A quick connection according to claim 3, wherein said second gudgeon is designed to house a hydraulic actuator for operation of said opposed pins.

5. A quick safety connection according to claim 1, wherein said auxiliary constraining element includes a second gudgeon with a horizontal axis parallel to that of said main support element, and wherein said movable member associated with said auxiliary constraining element includes a rod designed to partially enter into an axial seat made in said second gudgeon to set said second gudgeon in reciprocal engagement with at least a corresponding one of said at least one fastening eyelet.

6. A quick connection according to claim 1, wherein said calibrated inlet opening is delimited at its top by said support means and at its bottom by said stop.

7. A quick connection according to claim 1, wherein said support means have a overturned U-cross-sectional shape.

8. A quick connection according to claim 1, wherein said shaped body includes a vertical edge designed to frontally contact said swivel head when the swivel head is inside said shaped body.

9. A quick safety connection according to claim 1, wherein said shaped body includes a step, designed to contact said winglet plate at a bottom when said swivel head is in its lowered position inside said shaped body.

10. A quick safety connection according to claim 1, wherein said actuator associated with the swivel head is hydraulic.

11. A quick safety according to claim 1, further comprising:
   a device capable of automatically identifying a tool that is joined to said operating machine, the device including:
      a detection module, associated with said support frame; and
      an identifying module, associated with said shaped body,
      wherein the detection module is capable of radiofrequency (RF) communication with the identifying module.

12. A connection system for connecting a tool to an operating machine, the system comprising:
   a) a first connection component, including:
      a body;
      a retaining structure;
      a first connection element; and
      a safety retainer; and
   b) a second connection component, including:
      a frame having a gudgeon;
      a first extending support element receivable within the gudgeon;
      a swivel element attached to the frame via the first extending support element and configured to pivot about the first extending support element at a first connection point;
      a second extending support element attached to the swivel element at a second connection point;
      a safety extension extending from the swivel element; and
      an actuator connected at a first end to the frame and at a second end to the swivel element;
   the system being configured such that the first connection component forms a receiving path delineated by the retaining structure and the safety retainer, such that when the first extending support element of the second connection component engages the receiving path, the swivel element rotates about the first extending support element such that the first extending support element travels along the receiving path toward the retaining structure and the second extending support element rotates toward the first connection element so as to thereby connect the first connection component and the second connection component;
wherein the safety retainer is configured to engage the safety extension in a manner that inhibits disconnection of the first connection component and the second connection component after the second connection component has entered into the receiving path, the system being configured such that the safety retainer does not interact with the safety extension during insertion of the second connection component into the receiving path;
wherein the second extending support element includes a moveable member configured to engage first connection element upon connection of the first connection component and the second connection component.

13. A connection system according to claim 12, wherein the second extending support element includes:
the moveable member; and
a second gudgeon with a horizontal axis parallel to a horizontal axis of the first extending support element,
wherein the movable member includes a pair of opposed pins, located at the ends of the second gudgeon and extending axially from the second gudgeon so as to engage the first connection element.

14. A connection system according to claim 12, wherein the second extending support element includes:
the moveable member; and
a second gudgeon with a horizontal axis parallel to a horizontal axis of the first extending support element,
wherein the movable member includes a rod designed to partially enter into an axial seat of the second gudgeon.

15. A connection system according to claim 12, wherein the retaining structure has a U-cross-sectional shape.

16. The connection system according to claim 12, wherein the body of the first connection component includes a vertical edge that contacts the swivel element when the swivel element engages the receiving path.

17. The connection system according to claim 12, wherein the actuator associated with the swivel element is hydraulically operated.

18. A quick safety according to claim 12, further comprising:
a device capable of automatically identifying a tool that is joined to said operating machine, the device including:
a detection module, associated with the frame; and
an identifying module, associated with the body,
wherein the detection module is capable of radiofrequency (RF) communication with the identifying module.

* * * * *